(12) United States Patent
Oliver et al.

(10) Patent No.: US 9,386,046 B2
(45) Date of Patent: Jul. 5, 2016

(54) STATISTICAL MESSAGE CLASSIFIER

(71) Applicant: Dell Software Inc., Round Rock, TX (US)

(72) Inventors: Jonathan J. Oliver, San Carlos, CA (US); Scott Roy, San Jose, CA (US); Scott D. Eikenberry, Menlo Park, CA (US); Bryan Kim, Mountain View, CA (US); David A. Koblas, Los Altos, CA (US); Brian K. Wilson, Palo Alto, CA (US)

(73) Assignee: DELL SOFTWARE INC., Round Rock, TX (US)

( * ) Notice: Subject to any disclaimer, the term of this patent is extended or adjusted under 35 U.S.C. 154(b) by 0 days.

(21) Appl. No.: 14/312,645

(22) Filed: Jun. 23, 2014

(65) Prior Publication Data

US 2014/0304829 A1  Oct. 9, 2014

Related U.S. Application Data

(63) Continuation of application No. 13/340,509, filed on Dec. 29, 2011, now Pat. No. 8,776,210, which is a continuation of application No. 10/650,487, filed on Aug. 27, 2003.

(60) Provisional application No. 60/489,148, filed on Jul. 22, 2003.

(51) Int. Cl.
*H04L 29/06* (2006.01)
*G06N 99/00* (2010.01)
*H04L 12/58* (2006.01)

(52) U.S. Cl.
CPC ............ *H04L 63/308* (2013.01); *G06N 99/005* (2013.01); *H04L 51/12* (2013.01)

(58) Field of Classification Search
CPC .............................. H04L 51/12; H04L 63/308
See application file for complete search history.

(56) References Cited

U.S. PATENT DOCUMENTS

| | | | |
|---|---|---|---|
| 5,768,422 | A | 6/1998 | Yaeger |
| 6,023,723 | A | 2/2000 | McCormick et al. |
| 6,112,227 | A | 8/2000 | Heiner |
| 6,161,130 | A | 12/2000 | Horvitz et al. |
| 6,199,102 | B1 | 3/2001 | Cobb |
| 6,421,709 | B1 | 7/2002 | McCormick et al. |
| 6,650,890 | B1 | 11/2003 | Irfam et al. |

(Continued)

OTHER PUBLICATIONS

"Majordomo FAQ," Oct. 20, 2001.

(Continued)

*Primary Examiner* — Shawnchoy Rahman
(74) *Attorney, Agent, or Firm* — Polsinelli LLP

(57) ABSTRACT

A system and method are disclosed for improving a statistical message classifier. A message may be tested with a machine classifier, wherein the machine classifier is capable of making a classification on the message. In the event the message is classifiable by the machine classifier, the statistical message classifier is updated according to the reliable classification made by the machine classifier. The message may also be tested with a first classifier. In the event that the message is not classifiable by the first classifier, it is tested with a second classifier, wherein the second classifier is capable of making a second classification. In the event that the message is classifiable by the second classifier, the statistical message classifier is updated according to the second classification.

28 Claims, 3 Drawing Sheets

(56) References Cited

U.S. PATENT DOCUMENTS

| | | | |
|---|---|---|---|
| 6,675,162 | B1 | 1/2004 | Russell-Falla et al. |
| 6,778,941 | B1 | 8/2004 | Worrell et al. |
| 6,779,021 | B1 | 8/2004 | Bates et al. |
| 6,785,728 | B1 | 8/2004 | Schneider et al. |
| 6,810,404 | B1 | 10/2004 | Ferguson et al. |
| 6,941,348 | B2 | 9/2005 | Petry et al. |
| 7,117,358 | B2 | 10/2006 | Bandini et al. |
| 7,222,157 | B1 | 5/2007 | Sutton, Jr. |
| 7,539,726 | B1 | 5/2009 | Wilson et al. |
| 7,814,545 | B2 | 10/2010 | Oliver |
| 8,776,210 | B2 | 7/2014 | Oliver |
| 2002/0199095 | A1 | 12/2002 | Bandini et al. |
| 2003/0088627 | A1 | 5/2003 | Rothwell et al. |
| 2003/0172291 | A1 | 9/2003 | Judge et al. |
| 2003/0195937 | A1 | 10/2003 | Kircher, Jr. |
| 2003/0204569 | A1 | 10/2003 | Andrews et al. |
| 2003/0233418 | A1 | 12/2003 | Goldman |
| 2004/0024639 | A1 | 2/2004 | Goldman |
| 2004/0093371 | A1* | 5/2004 | Burrows ............... H04L 12/585 709/201 |
| 2004/0117648 | A1 | 6/2004 | Kissel |
| 2004/0128355 | A1 | 7/2004 | Chao et al. |
| 2004/0158554 | A1 | 8/2004 | Trottman |
| 2004/0167964 | A1 | 8/2004 | Rounthwaite |
| 2004/0177110 | A1 | 9/2004 | Rounthwaite et al. |
| 2004/0177120 | A1 | 9/2004 | Kirsch |
| 2004/0181581 | A1 | 9/2004 | Kosco |
| 2004/0260776 | A1 | 12/2004 | Starbuck et al. |
| 2004/0267886 | A1 | 12/2004 | Malik |
| 2005/0015626 | A1 | 1/2005 | Chasin |
| 2005/0055410 | A1 | 3/2005 | Landsman et al. |
| 2005/0125667 | A1 | 6/2005 | Sullivan et al. |
| 2008/0104186 | A1 | 5/2008 | Wieneke et al. |
| 2009/0132669 | A1 | 5/2009 | Milliken |
| 2012/0101967 | A1 | 4/2012 | Oliver |

OTHER PUBLICATIONS

Balvanz, Jeff et al., "Spam Software Evaluation, Training, and Support: Fighting Back to Reclaim the Email Inbox," in the Proc. of the 32nd Annual ACM SIGUCCS Conference on User Services, Baltimore, MD, pp. 385-387, 2004.
Byrne, Julian "My Spamblock," Google Groups Thread, Jan. 19, 1997.
Cranor, Lorrie et al., "Spam!," Communications of the ACM, vol. 41, Issue 8, pp. 74-83, Aug. 1998.
Dwork, Cynthia et al., "Pricing via Processing or Combating Junk Mail," CRYPTO '92, Springer-Verlag LNCS 740, pp. 139-147, 1992.
Gabrilovich et al., "The Homograph Attack," Communications of the ACM, 45 (2):128, Feb. 2002.
Gomes, Luiz et al., "Characterizing a Spam Traffic," in the Proc. of the 4th ACM SIGCOMM Conference on Internet Measurement, Sicily, Italy, pp. 356-369, 2004.
Guilmette, Ronald F., "To Mung or Not to Mung," Google Groups Thread, Jul. 24, 1997.
Jason Rennie, "ifile v.0.1 Alpha," Aug. 3, 1996, Carnegie Mellon University: http://www.ai.mit.edu/.about.jrennie/ifile/oldREADME-0.1A.
Jung, Jaeyeon et al., "An Empirical Study of Spam Traffic and the Use of DNS Black Lists," IMC'04, Taormina, Sicily, Italy, Oct. 25-27, 2004.
Langberg, Mike "Spam Foe Needs Filter of Himself," Email Thread dtd. Apr. 5, 2003.
McCullagh, Declan "In-Boxes that Fight Back," News.com, May 19, 2003.
Mehran Sahami, et al., "A Bayesian Approach to Filtering Junk E-Mail," Proceedings of AAAI-98 Workshop on Learning for Text Categorization, Jul. 1998.
Patrick Pantel, et al., "SpamCop: A Spam Classification & Organization Program," Mar. 11, 1998, Dept. of Computer Science, University of Manitoba, Winnipeg, Manitoba, Canada.
Paul Graham, "A Plan for Spam," 2004 Spam Conference, Cambridge, MA, http://www.paulgraham.com/spam.html.
Paul Graham, "Better Bayesian Filtering," 2003 Spam Conference, Cambridge, MA: http:///www.paulgraham.com/better.html. cited by other.
Paul Graham, "Will Filters Kill Spam?" Dec. 2002, http://www.paulgraham.com/wfks.html.
Robinson, Gary, "A statistical approach to the spam problem", Mar. 2003, Linux Journal, vol. 2003, Issue 107.
Salib, Michael, "MeatSlicer: Spam Classification with Naieve Bayes and Smart Heuristics", pp. 1-39 Dec. 12, 2002.
Skoll, David F., "How to Make Sure a Human is Sending You Mail," Google Groups Thread, Nov. 17, 1996.
Templeton, Brad "Viking-12 Junk E-Mail Blocker," (believed to have last been updated Jul. 15, 2003).
Von Ahn, Luis et al., "Telling Humans and Computers Apart (Automatically) or How Lazy Cryptographers do AI," Communications to the ACM, Feb. 2004.
Weinstein, Lauren "Spam Wars," Communications of the ACM, vol. 46, Issue 8, p. 136, Aug. 2003.
William S. Yerazunis, "Sparse Binary Polynomial Hashing and the CRM114 Discriminator," 2003 Spam Conference, Cambridge, MA.
U.S. Appl. No. 10/650,487 Office Action mailed on Aug. 17, 2007.
U.S. Appl. No. 10/650,487 Final Office Action mailed on Jan. 25, 2007.
U.S. Appl. No. 10/650,487 Office Action mailed on Aug. 24, 2006.
U.S. Appl. No. 11/927,493 Final Office Action mailed on Jan. 5, 2010.
U.S. Appl. No. 11/927,493 Office Action mailed on Jun. 15, 2009.
U.S. Appl. No. 13/340,509 Final Office Action mailed on Dec. 24, 2013.
U.S. Appl. No. 13/340,509 Office Action mailed on Sep. 6, 2013.

* cited by examiner

STATISTICAL MESSAGE CLASSIFIER

CROSS-REFERENCE TO RELATED APPLICATIONS

The application is a continuation and claims the priority benefit of U.S. patent application Ser. No. 13/340,509 filed Dec. 29, 2011, which is a continuation and claims the priority benefit of U.S. patent application Ser. No. 10/650,487 filed Aug. 27, 2003, which claims the priority benefit of U.S. provisional application 60/489,148 filed Jul. 22, 2003, the disclosures of which are incorporated by reference for all purposes.

BACKGROUND OF THE INVENTION

1. Field of the Invention

The present invention relates generally to message classification. More specifically, a technique for avoiding junk messages (spam) is disclosed.

2. Description of the Related Art

Electronic messages have become an indispensable part of modem communication. Electronic messages such as email or instant messages are popular because they are fast, easy, and have essentially no incremental cost. Unfortunately, these advantages of electronic messages are also exploited by marketers who regularly send out unsolicited junk messages. The junk messages are referred to as "spam", and spam senders are referred to as "spammers". Spam messages are a nuisance for users. They clog people's inbox, waste system resources, often promote distasteful subjects, and sometimes sponsor outright scams.

Personalized statistical search is a technique used by some systems for detecting and blocking spam messages. Personalized statistical searches typically depend on users to sort the messages into categories. For example, the users may put spam messages into a junk folder and keep good messages in the inbox. The spam protection program periodically updates the personalized statistical searcher by processing the categorized messages. When a new message comes in, the improved statistical searcher determines whether the incoming message is spam. The updating of the personalized statistical searcher is typically done by finding the tokens and features in the messages and updating a score or probability associated with each feature or token found in the messages. There are several techniques that are applicable for computing the score or probability. For example, if "cash" occurs in 200 of 1,000 spam messages and three out of 500 non-spam messages, the spam probability associated with the word is $(200/1000)/(3/500+200/1000)=0.971$. A message having a high proportion of tokens or features associated with high spam probability is likely to be a spam message.

Personalized statistical searches have been gaining popularity as a spam fighting technique because of several advantages. Once trained, the spam filter can detect a large proportion of spam effectively. Also, the filters adapt to learn the type of words and features used in both spam and non-spam. Because they consider evidence of spam as well as evidence of good email, personal statistical searches yield few false positives (legitimate non-spam email that are mistakenly identified as spam). Additionally, the filters can be personalized so that a classification is tailored for the individual. However, personalized statistical searchers also have several disadvantages. Since their training requires messages that are categorized by the users, they are typically deployed on the client, and are not well suited for server deployment. Also, classifying email messages manually is a labor intensive process, therefore is not suitable for deployment at the corporate level where large amounts of messages are received. It would be desirable to have statistical searches that do not depend on manual classification by users, and are suitable for server deployment and corporate level deployment.

SUMMARY OF THE PRESENTLY CLAIMED INVENTION

An According to an exemplary embodiment, a method for improving a statistical message classifier includes testing a message with a machine classifier. The machine classifier may be capable of making a classification of the message. In the event that the machine classifier makes the classification, the method includes updating the statistical message classifier according to the classification made by the machine classifier. The statistical message classifier may be configured to detect an unsolicited message and includes a knowledge base that tracks the spam probability of features in classified messages.

According to another exemplary embodiment, a method for improving a statistical message classifier includes testing a message with a first classifier. The first classifier may be capable of making a first classification. In the event that the message is classifiable by the first classifier, the method includes updating the statistical message classifier according to the first classification. In the event that the first classifier does not make the classification, the method includes testing the message with a second classifier. The second classifier may be capable of making a second classification. In the event that the second classifier makes the classification, the method includes updating the statistical message classifier according to the second classification. The statistical message classifier may be configured to detect an unsolicited message and includes a knowledge base that tracks the spam probability of features in classified messages.

According to another exemplary embodiment, a system for classifying a message includes a statistical message classifier configured to detect an unsolicited message and includes a knowledge base that tracks the spam probability of features in classified messages. The system also includes a machine classifier coupled to the statistical message classifier. The message classifier is configured to test the message. The machine classifier may be capable of making a reliable classification. In the event the machine classifier makes the classification, the statistical message classifier is updated according to the reliable classification made by the machine classifier.

According yet another exemplary embodiment, a system for improving a statistical message classifier includes a first classifier configured to test the message, reliably make a first classification, and update the statistical message classifier according to the first classification in the event that the first classifier makes the classification. The statistical message classifier is configured to detect an unsolicited message and includes a knowledge base that tracks the spam probability of features in classified messages. The system also includes a second classifier coupled to the first classifier and that is capable of reliably making a second classification. The second classifier is also configured to further test the message in the event that the message is not classifiable by the first classifier.

Some embodiments include a computer readable medium having embodied thereon a program, the program being executable by a processor to perform a method for improving a statistical message classifier. The method includes testing a message with a machine classifier. The machine classifier may be capable of making a reliable classification. In the event the machine classifier makes the classification, the method includes• updating the statistical message classifier according to the reliable classification made by the machine classifier. The statistical message classifier may be configured to detect an unsolicited message and includes a knowledge base that tracks the spam probability of features in classified messages.

Other embodiments include a computer readable medium having embodied thereon a program, the program being executable to perform a method for improving a statistical message classifier. The method includes testing a message with a first classifier. The first classifier may be capable of reliably making a first classification. In the event that the first classifier makes the classification, the method includes updating the statistical message classifier according to the first classification. The statistical message classifier may be configured to detect an unsolicited message and includes a knowledge base that tracks the spam probability of features in classified messages. In the event that the first classifier does not make the classification, the method includes testing the message with a second classifier. The second classifier may be capable of reliably making a second classification. In the event that the second classifier makes the classification, the method includes updating the statistical message classifier according to the second classification.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Embodiments The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, are referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

An improved technique for improving a statistical message classifier is disclosed. In some embodiments, a classifier tests messages and attempts to make a classification. If the message is classified by the classifier, information pertaining to the message is used to update the statistical message classifier. The classifier is preferably a reliable classifier such as a whitelist classifier, a collaborative fingerprinting classifier, an image analyzer, a probe account, a challenge-response classifier, or any other appropriate classifier. A reliable good classifier and a reliable junk classifier are sometimes used in some embodiments. In some embodiments, the same classifier may classify both good and junk messages. The classifiers may be machine classifiers or user-augmented classifiers.

As used herein, a message refers to an e-mail message, an instant message, a text message, and/or any other appropriate information transmitted electronically. For the sake of clarity, in the following examples, techniques used for e-mail messages are discussed in detail; however, the techniques are also applicable for any other types of messages.

Figure 1:
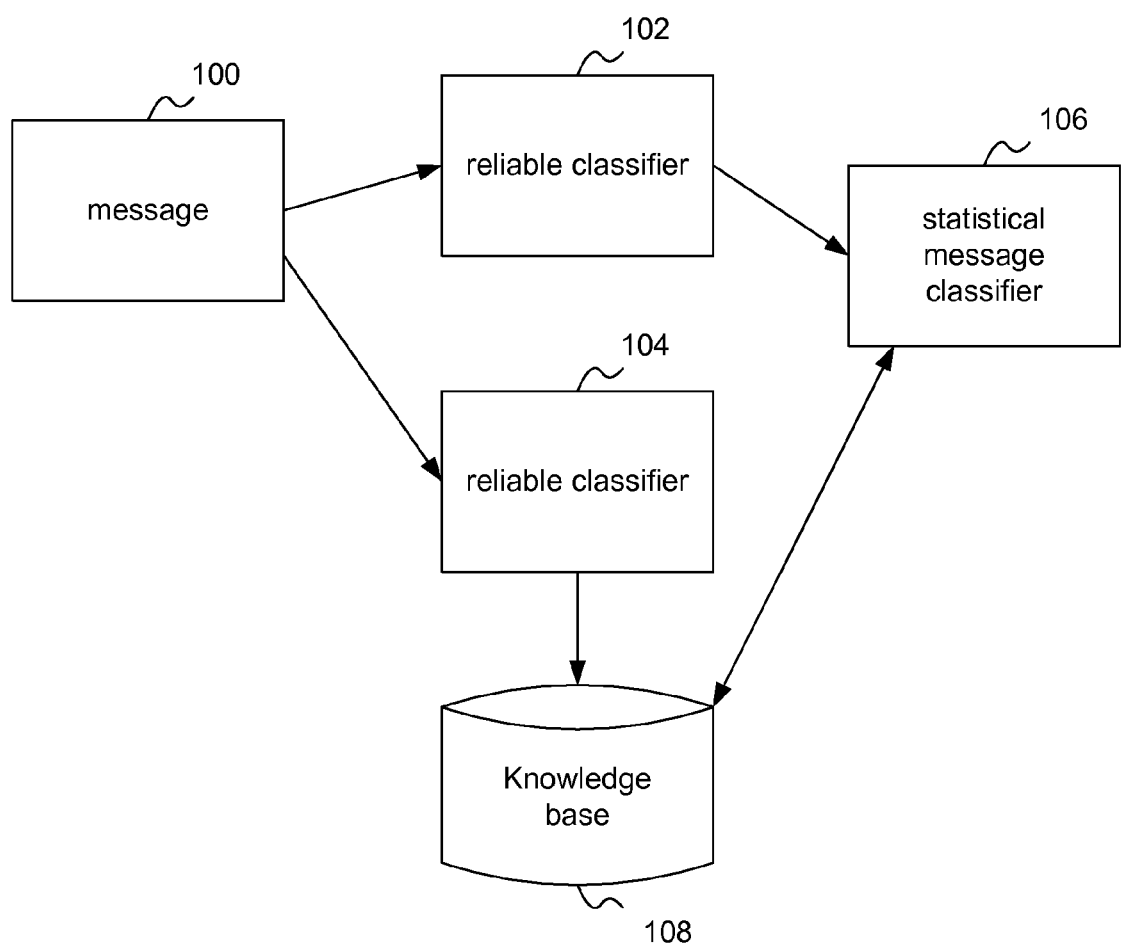
FIG. 1 is a block diagram illustrating a statistical message filter embodiment.

FIG. 1 is a block diagram illustrating a statistical message filter embodiment. Reliable classifiers 102 and 104 process incoming message 100 to make a classification. Although two reliable classifiers are shown, one or more classifiers may be used in other embodiments and the number of reliable classifiers may vary for different implementations. The message may be classified as spam, non-spam, or any other appropriate category. A statistical message classifier 106 is trained using the results from the reliable classifiers periodically or as messages are processed. The reliable classifier may directly update the statistical message classifier, or store the results in a knowledge base 108 that is then used to update the statistical message classifier.

The reliability of a classifier depends on how accurately it makes a classification. The reliable classifiers are so named because when they make a classification, the classification is reliable and the outcome of the classification is likely to be correct. It should be noted that the reliable classifiers sometimes do not make any classification of a message. For example, a reliable classifier may classify 20% of the messages it processes as spam, 10% as non-spam, and makes no judgment on the rest 70% of the messages. Of the messages that are determined to be either spam or non-spam, the probability of erroneous classification may be less than 1%. While the actual percentages and criteria may vary for different implementations, a classifier is considered to be reliable as long as it is able to in some cases make a more accurate classification than the statistical message classifier under training.

There are several types of reliable classifiers that may be applicable for statistical message filtering, including: an adaptive whitelist that reliably classifies non-spam messages, a collaborative fingerprinting filter that classifies spam messages, an image analyzer that is capable of determining flesh tones in pornographic spam messages, a probe account that does not belong to any legitimate user and presumably only receives spam messages, a challenge-response classifier, etc. Once a classification is made by the reliable classifier, the statistical message classifier is updated accordingly. In some embodiments, the statistical message classifier includes a knowledge base that tracks the spam probability of features in classified messages. The features may include words, tokens, message identifier, message protocol, address, hypertext markup language document (HTML) properties or any other appropriate aspects of the message that can be used to train the statistical message classifier.

The reliable classifiers may update the statistical message classifier by processing messages such as previously stored messages, outgoing messages and incoming messages. The reliable classifiers are preferably machine classifiers that can process large amounts of messages more efficiently than manually classifying the messages. Using machine classifiers makes a statistical message classifier more suitable for server and corporate level deployment.

Figure 2:
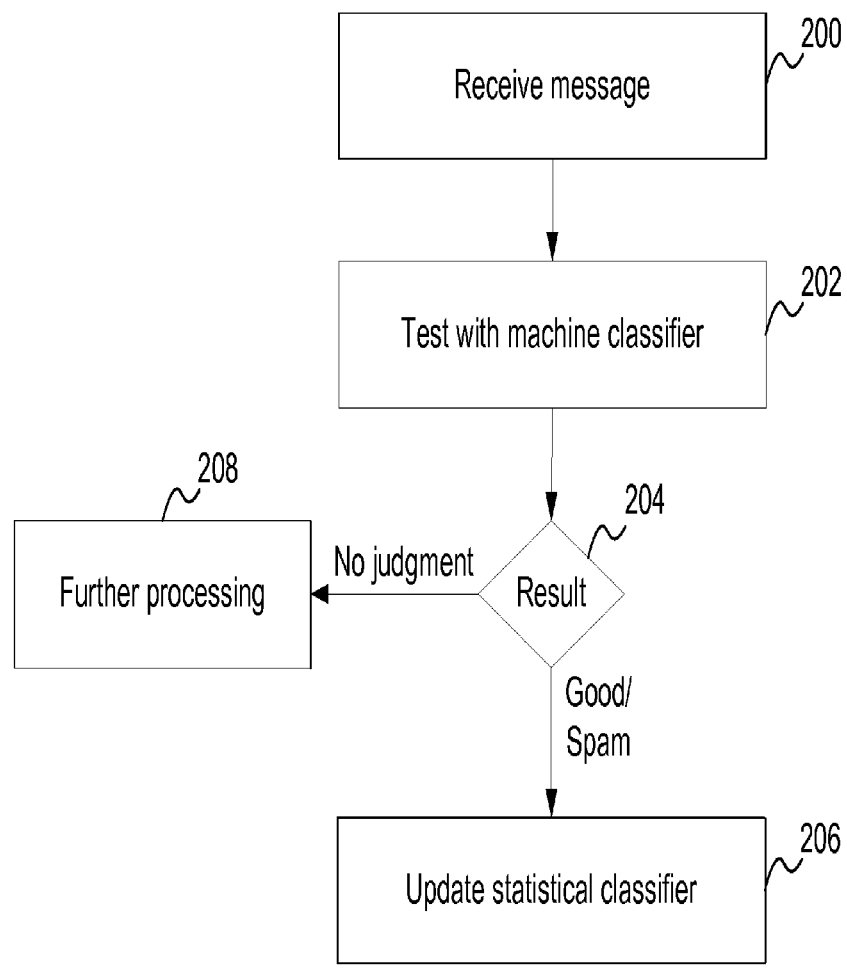
FIG. 2 is a flowchart illustrating the processing of a message by a system embodiment that includes a statistical classifier.

FIG. 2 is a flowchart illustrating the processing of a message by a system embodiment that includes a statistical classifier. Once a message is received (200), it is tested with a machine classifier (202). The machine classifier is preferably a reliable one although other classifiers may also be used. The classifier attempts to classify the message and provides a classification result (204). If the message is classified as either good or spam, the statistical classifier is updated (206). If, however, the machine classifier does not make a judgment on the message, the message is then further processed (208). In some embodiments, the message is delivered to the user. In some embodiments, the message is further classified by other classifiers. In some embodiments, the statistical classifier is used to further test the message.

The techniques may be used to update a statistical message classifier for an individual user or a group of users. In some embodiments, the users share a statistical message classifier that is updated when a reliable classifier classifies the message. In some embodiments, the users have their own statistical message classifiers. Once a reliable classifier classifies the message, the statistical message classifiers of the individual users are updated.

Figure 3:
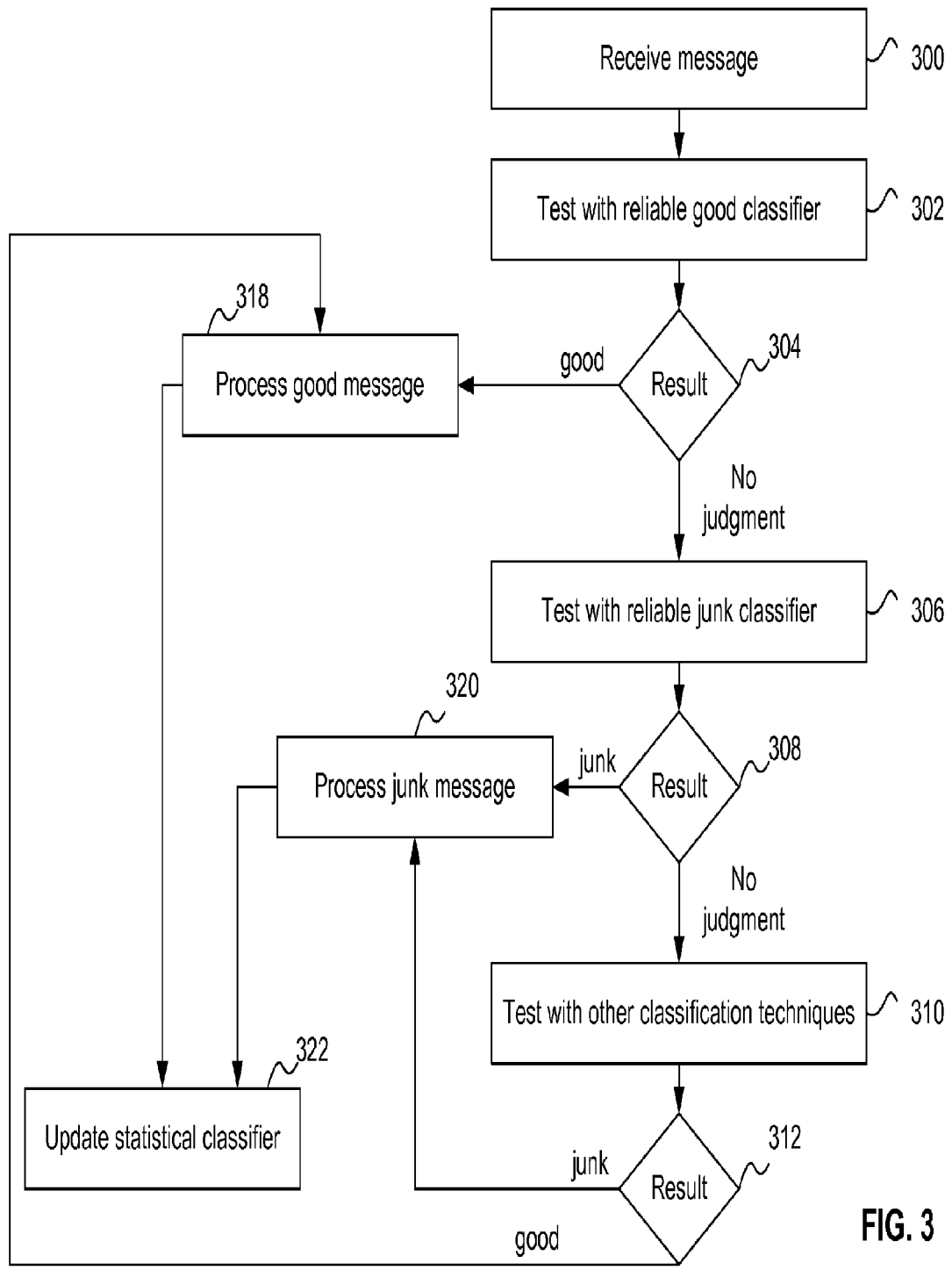
FIG. 3 is a flowchart illustrating the processing of a message by another system 15 embodiment that includes a statistical classifier.

FIG. 3 is a flowchart illustrating the processing of a message by another system embodiment that includes a statistical classifier. Once a message is received (300), it is first tested with a reliable good classifier (302). The reliable good classifier is able to make a classification of messages that are good (i.e., non-spam) reliably. In one embodiment the reliable good classifier is a whitelist classifier that classifies the message based on a database of known allowable sender addresses. The testing result may indicate that the message is good, and control is transferred from 304 to 318, where the good message is processed accordingly; in some embodiments the message is delivered to the intended recipient. If, however, the reliable good classifier makes no judgment on whether the message is good, control is transferred from 304 to 306, where the message is further tested with a reliable junk classifier. Although the reliable good classifier and the reliable junk classifier are two distinct classifiers in this embodiment, a single classifier may function both as the reliable good classifier and the reliable junk classifier.

The reliable junk classifier, for example, a classifier that uses a collaborative fingerprinting technique, is capable of reliably determining whether a message is junk. If the message is determined to be junk, control is transferred from 308 to 320 where the junk message is processed accordingly. In some embodiments, the junk message is quarantined; in some embodiments the junk message is deleted. If, however, the reliable junk classifier is unable to determine whether the message is junk, control is then optionally transferred from 308 to 310, where other classification techniques are applied. In some embodiments, the statistical classifier is used to further test the message. If the other classification techniques determine that the message is a good message, control is then transferred from 312 to 318 where the good message is processed as such. If the message is classified as junk, control is transferred from 312 to 320, where the junk message is processed accordingly. Whether the message is determined to be good or junk, this information is useful for updating the statistical classifier. Thus, control is transferred to updating the statistical classifier (322) from both 318 and 320. The order of testing may be different for other embodiments. Although the reliable classifiers are preferably machine classifiers, the process is also applicable to classifications done by a person.

There are several ways to update the statistical classifier. In some embodiments, a training set is updated using the tokens or features of the classified message. In some embodiments, a statistical model used by the classifier is updated to reflect the classification information derived from the message. In some embodiments, in order to protect the privacy of email recipients, the information pertaining to the messages is encrypted. In some embodiments, the encryption is omitted since the tokens or features in the messages are parsed and stored in such a way that the original message cannot be easily reconstructed and thus does not pose a serious threat to privacy.

An example is shown below to illustrate how the statistical model is improved using classified messages. The reliable classifiers classify received messages and provide the statistical message classifier with a knowledge base. A message is parsed to obtain various features. If the message is determined to be good, the "good count" for each of the features in the message is incremented, and if the message is determined to be spam, the "spam count" for each of the features in the message is decremented. Table 1 is used in some embodiments to store various features and the number of times they are determined either as good or spam:

TABLE 1

| Feature Name | Good Count | Spam Count |
|---|---|---|
| mortgage | 10 | 1 |
| auto | 1 | 10 |
| greeting | 3 | 1 |
| ... | ... | ... |

In some embodiments, user inputs are used to augment the classification made by the reliable classifiers. Since the user's decisions are ultimately the most reliable classification available, the user-augmented classification is given extra weight in some embodiments. Table 2 is used in some embodiments to track the user classification. If a non-spam or unclassified message delivered to a user is determined to be junk by the user, the junk count is then incremented. If the message is determined to be junk by the classifier, but the user reverses the decision, the unjunk count is then incremented. Optionally, a whitelist counter is used to track the number off times a feature has appeared in whitelisted emails. Typically, a whitelisted email is email that comes from an address stored in the recipient's address book or an address to which the recipient has previously sent a message. Instead of scoring all the white listed messages, in some embodiments a portion of white listed messages are processed.

TABLE 2

| Feature Name | Junk Count | Unjunk Count | Whitelist Count | Score |
|---|---|---|---|---|
| mortgage | 552 | 7 | 7 | −3.33 |
| auto | 132 | 5 | 186 | 0.58 |
| greeting | 16 | 1 | 11 | 0.07 |
| ... | ... | ... | ... | |

A score for each feature may be computed based on the counter values in the tables and a predetermined score function. In one embodiment, the score is computed based on counters from both tables using the following equations:

$$CountA = S1 * SpamCount + S2 * JunkCount \quad \text{(equation 1)}$$

$$CountB = S3 * GoodCount + S4 * UnjunkCount + S5 * WhiteListCount \quad \text{(equation 2)}$$

$$FeatureScore = SCORE\_FUNCTION(CountA, CountB) \quad \text{(equation 3)}$$

where S1, S2, S3, S4 and S5 are learning parameters of the system that may be adapted to minimize error rate, and SCORE_FUNCTION is a function dependent on the statistical model that is used.

In one embodiment, the learning parameters are all equal to 1 and the following score function is used:

$$SCORE\_FUNCTION = -\log\left(\frac{CountA + A}{TotalSpam + B}\right) + \log\left(\frac{CountB + A}{TotalGood + B}\right) \quad \text{(equation 4)}$$

where TotalSpam is the total number of spam messages identified and TotalGood is the total number of good messages identified, and A and B are prior constants that may vary in different implementations. In this embodiment, A is 10 and B is 250. For example, if "cash" occurs in 200 of 1,000 spam messages and three out of 500 non-spam messages, its feature score is computed as the following:

$$SCORE\_FUNCTION = -\log\left(\frac{200 + 10}{1000 + 250}\right) + \log\left(\frac{3 + 10}{500 + 250}\right) = 2.2713$$

A technique for improving a statistical message classifier has been disclosed. In some embodiments, the statistical message classifier is updated according to message classification by a machine classifier. In some embodiments, the statistical message classifier is updated according to the classification made by one or more other type of classifiers. These techniques reduce the amount of labor required for training a statistical message classifier, and make such classifier more suitable for server deployment.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method for improving a statistical message classifier, the method comprising:
   receiving a message over a network communication interface;
   identifying by a processor executing instructions out of a memory a feature in the message that is associated with a junk count;
   testing the message with a machine classifier by the processor performing a calculation according to a logarithmic function including the junk count, wherein the machine classifier outputs a value for the statistical message classifier for storage in the memory;
   updating the statistical message classifier stored in the memory according to the logarithmic calculation made by the machine classifier, wherein the stored statistical message classifier corresponds to a probability that the feature in the message is spam;
   identifying that the message is spam based on the probability that the feature in the message is spam; and
   quarantining the message.

2. The method for improving a message classifier as recited in claim 1, wherein the machine classifier is further capable of making no classification on the message.

3. The method for improving a message classifier as recited in claim 1, wherein the machine classifier includes a white list classifier.

4. The method for improving a message classifier as recited in claim 1, wherein the machine classifier includes a collaborative fingerprinting classifier.

5. The method for improving a message classifier as recited in claim 1, wherein the machine classifier includes an image analyzer.

6. The method for improving a message classifier as recited in claim 1, wherein the machine classifier includes a probe account.

7. The method for improving a message classifier as recited in claim 1, wherein the machine classifier includes a challenge-response classifier.

8. The method for improving a message classifier as recited in claim 1, wherein updating the statistical message classifier comprises updating a knowledge base used to train the statistical message classifier.

9. The method for improving a message classifier as recited in claim 1, wherein updating the statistical message classifier comprises updating a statistical model used by the statistical message classifier.

10. The method for improving a message classifier as recited in claim 1, wherein updating the statistical message classifier comprises parsing the message to obtain the feature.

11. The method for improving a message classifier as recited in claim 1, wherein updating the statistical message classifier comprises parsing the message to obtain the feature and updating a counter corresponding to the feature.

12. The method for improving a message classifier as recited in claim 1, wherein updating the statistical message classifier comprises parsing the message to obtain the feature and updating a training set.

13. The method for improving a message classifier as recited in claim 1, wherein updating the statistical message classifier comprises parsing the message to obtain a feature and computing a spam probability associated with the feature.

14. The method for improving a message classifier as recited in claim 1, wherein updating the statistical message classifier comprises parsing the message to obtain the feature and computing a score associated with the feature.

15. The method for improving a message classifier as recited in claim 1, wherein the message is a previously stored message.

16. The method for improving a message classifier as recited in claim 1, wherein the message is an incoming message.

17. The method for improving a message classifier as recited in claim 1, in the event that the message is not classifiable by the classifier, further comprising testing the message with another machine classifier.

18. A method for improving a statistical message classifier comprising:

receiving a message over the network communication interface;

identifying by a processor executing instructions out of a memory a feature in the message that is associated with a junk count;

testing message with a first classifier by the processor performing a calculation according to a logarithmic function including the junk count, wherein the first classifier outputs a value for the statistical message classifier for storage in the memory and a first classification;

in the event that the message is classifiable by the first classifier, updating the statistical message classifier according to the logarithmic calculation;

in the event that the first classifier does not make the first classification, testing the message with a second classifier, wherein the second classifier is capable of making a second classification by the processor; and updating the statistical message storage in the memory classifier according to the second classification by the processor, wherein the statistical message corresponds to a probability that the feature in the message is spam;

identifying that the message is not spam based on the probability that the feature in the message is spam; and delivering the message to a recipient based on identifying that the message is not spam.

19. The method for improving a message classifier as recited in claim 18, wherein the second classifier is a reliable classifier having a probability of erroneous classification of less than one percent.

20. A method for improving a statistical message classifier comprising:

receiving a message over a network communication interface;

identifying by a processor executing instructions out of a memory a feature in the message that is associated with a good count;

testing the message with a first classifier wherein the first classifier is a reliable good classifier capable of making a first classification by the processor performing a calculation according to a logarithmic function including the good count, wherein the first classifier outputs a value for the statistical message classifier for storage in the memory;

in the event that the message is classifiable by the first classifier, updating the statistical message classifier stored in the memory according to the first classification by the processor performing the logarithmic calculation;

in the event that the first classifier does not make the first classification, testing the message with a second classifier, wherein the second classifier is capable of making a second classification; and updating the statistical message classifier stored in the memory according to the second classification by the processor, wherein the statistical message classifier corresponds to a probability that the feature in the message is spam;

identifying that the message is not spam based on the probability that the feature in the message is spam; and delivering the message to a recipient based on identifying that the message is not spam.

21. A method for improving a statistical message classifier comprising:

receiving a message over a network communication interface;

identifying by a processor executing instructions out of a memory a feature in the message that is associated with a junk count;

testing the message with a first classifier by the processor, wherein the first classifier is a reliable junk classifier capable of making a first classification by the processor performing a calculation according to a logarithmic function including the junk count, wherein the first classifier outputs a value for the statistical message classifier for storage in the memory;

in the event that the message is classifiable by the first classifier, updating the statistical message classifier stored in the memory according to the first classification by the processor performing the logarithmic calculation;

in the event that the first classifier does not make the first classification, testing the message with a second classifier, wherein the second classifier is capable of making a second classification; and updating the statistical message classifier stored in the memory according to the second classification by the processor, wherein the statistical message classifier corresponds to a probability that the feature in the message is spam;

identifying that the message is spam based on the probability that the feature in the message is spam; and quarantining the message.

22. The method for improving a message classifier as recited in claim 20, wherein the second classifier is a reliable good classifier having a probability of erroneous classification of less than one percent.

23. The method for improving a message classifier as recited in claim 21, wherein the second classifier is a reliable junk classifier having a probability of erroneous classification of less than one percent.

24. The method for improving a message classifier as recited in claim 21, wherein the first classifier is user-augmented.

25. A system for classifying a message, comprising:

a memory;

a processor; and a network interface, wherein:

a message is received over the network communication interface;

the processor executing instructions out of the memory:

identifies a feature in the message that is associated with a junk count, wherein a statistical message classifier stored in the memory corresponds to a probability that the feature in the message is spam, and tests the message with a message classifier by performing a calculation according to a logarithmic function including the junk count, machine classifier coupled to the statistical message classifier, the machine classifier configured to test the message and outputs a value for the statistical message classifier stored in the memory, and the statistical message classifier is updated according to the logarithmic calculation by the machine classifier and corresponds to a probability that the feature in the message is spam;

identifies that the message is spam based on the probability that the feature in the message is spam; and quarantines the message.

26. A system for improving a statistical message classifier, comprising:

a memory;

a processor; and a network interface, wherein:

a message is received over the network communication interface;

the processor executing instructions out of the memory:

identifies a feature in the message that is associated with a junk count tests the message using a first classifier making a first classification according to a calculation according to a logarithmic function including the junk count, the first classifier, the first classifier further outputs a value for the statistical message classifier for storage in the memory and updates the statistical message classifier according to the logarithmic calculation, wherein the statistical message corresponds to a probability that the feature in the message is spam; and second classifier coupled to the first classifier, capable of reliably making a second classification, and configured to further test the message in the event that the message is not classifiable by the first classifier;

identifies that the message is spam based on the probability that the feature in the message is spam; and quarantines the message.

27. A non-transitory computer readable storage medium having embodied thereon a program, the program being executable by a processor to perform a method for improving a statistical message classifier, the method comprising:

receiving a message over a network communication interface;

identifying by a processor executing instructions out of a memory a feature in the message that is associated with a junk count;

testing the message with a machine classifier by the processor performing a calculation according to a logarithmic function including the junk count, wherein the machine classifier is capable of making a classification of the message; and updating the statistical message stored in the memory classifier according to the reliable classification made by the machine classifier, wherein the statistical message classifier stored in the memory corresponds to a probability that the feature in the message is spam;

identifying that the message is spam based on the probability that the feature in the message is spam; and quarantining the message.

28. A non-transitory computer readable storage medium having embodied thereon a program, the program being executable to perform a method for improving a statistical message classifier, the method comprising:

receiving a message over a network communication interface;

identifying by a processor executing instructions out of a memory a feature in the message that is associated with a junk count testing the message with a fist classifier wherein the first classifier by the processor performing a calculation according to a logarithmic function including the junk count;

in the event that the first classifier makes the classification, updating the statistical message classifier stored in the memory according to the first classification, wherein the statistical message classifier stored in the memory corresponds to a probability that the feature in the message is spam;

in the event that the first classifier does not make the classification, testing the message with a second classifier, wherein the second classifier is capable of reliably making a second classification; and updating the statistical message classifier stored in the memory according to the second classifications;

identifying that the message is spam based on the probability that the feature in the message is spam; and quarantining the message.

* * * * *